(12) United States Patent
Gubbins et al.

(10) Patent No.: US 9,773,512 B2
(45) Date of Patent: Sep. 26, 2017

(54) STORAGE DEVICE HEAD USING HIGH MAGNETIC MOMENT MATERIAL INCLUDING A RARE EARTH MATERIAL AND A TRANSITION METAL

(71) Applicant: Seagate Technology LLC, Cupertino, CA (US)

(72) Inventors: Mark Anthony Gubbins, Donegal (IE); Vijayaharan A. Venugopal, Londonderry (GB); Marcus Benedict Mooney, Donegal (IE); Adam Andrzej Lapicki, Londonderry (GB); Muhammad Asif Bashir, Londonderry (GB); Prim Gangmei, Londonderry (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/975,214

(22) Filed: Dec. 18, 2015

(65) Prior Publication Data
US 2016/0180868 A1  Jun. 23, 2016

Related U.S. Application Data

(60) Provisional application No. 62/094,627, filed on Dec. 19, 2014.

(51) Int. Cl.
*G11B 5/31* (2006.01)
*G11B 5/39* (2006.01)

(52) U.S. Cl.
CPC .......... *G11B 5/3116* (2013.01); *G11B 5/3143* (2013.01); *G11B 5/3906* (2013.01); *G11B 5/3912* (2013.01)

(58) Field of Classification Search
CPC .... G11B 5/3143; G11B 5/3906; G11B 5/3912
USPC ............... 360/319, 324.12, 125.12, 125.3
See application file for complete search history.

(56) References Cited

U.S. PATENT DOCUMENTS

| | | | |
|---|---|---|---|
| 6,292,334 B1* | 9/2001 | Koike | G11B 5/3903 360/319 |
| 8,619,390 B2 | 12/2013 | Cazacu et al. | |
| 8,861,316 B2 | 10/2014 | Yin et al. | |
| 2003/0174446 A1* | 9/2003 | Hasegawa | B82Y 10/00 360/319 |
| 2006/0291108 A1* | 12/2006 | Sbiaa | B82Y 10/00 360/324.12 |
| 2008/0212241 A1* | 9/2008 | Schabes | G11B 5/3109 360/324.1 |

(Continued)

OTHER PUBLICATIONS

Sanyal, Biplab, et al., "Forcing Ferromagnetic Coupling Between Rare-Earth-Metal and 3d Ferromagnetic Films," The American Physical Society, Physical Review Letters, Apr. 16, 2010, 4 pages.

(Continued)

*Primary Examiner* — Jefferson Evans
(74) *Attorney, Agent, or Firm* — Holzer Patel Drennan

(57) ABSTRACT

A write pole structure includes a write pole and a trailing shield wherein the write pole includes a high magnetic moment (HMM) material layer on a surface of the write pole facing the trailing shield, wherein the HMM material layer includes a laminated layer including a rare earth material layer and a transition metal layer.

19 Claims, 8 Drawing Sheets

(56) References Cited

U.S. PATENT DOCUMENTS

| | | | |
|---|---|---|---|
| 2009/0257154 A1* | 10/2009 | Carey | B82Y 10/00 360/324.12 |
| 2010/0177449 A1* | 7/2010 | Zhao | B82Y 10/00 360/324.12 |
| 2013/0027809 A1* | 1/2013 | Min | C25D 5/022 360/122 |
| 2013/0314820 A1* | 11/2013 | Shimizu | G11B 5/3133 360/244.5 |
| 2014/0085569 A1* | 3/2014 | Choi | G02F 1/133606 349/64 |
| 2014/0168816 A1* | 6/2014 | Gubbins | G11B 5/3163 360/110 |
| 2014/0169146 A1 | 6/2014 | Yin et al. | |
| 2014/0177100 A1* | 6/2014 | Sugiyama | G11B 5/3116 360/125.03 |
| 2014/0268404 A1* | 9/2014 | Horide | G11B 5/235 360/75 |
| 2014/0293474 A1* | 10/2014 | Yamane | G11B 5/3932 360/75 |
| 2015/0043106 A1* | 2/2015 | Yamada | G11B 5/1278 360/123.05 |
| 2016/0005425 A1* | 1/2016 | McKinlay | G11B 5/265 360/121 |
| 2017/0077394 A1* | 3/2017 | Saida | H01L 43/10 |

OTHER PUBLICATIONS

Stromberg, F., et al., "Textured growth of the high moment material Gd (0001)/Cr(001)/Fe(001)," Journal of Physics D: Applied Physics 44, Jun. 16, 2011, 9 pages. http://iopscience.iop.org/article/10.1088/0022-3727/44/26/265004/meta;jsessionid=31DCEC8CA9B1B1B96C54B3AE4F9ACOB4.c2.iopscience.cld.iop.org.

Ward, C., et al., "Realizing a high magnetic moment in Gd/Cr/FeCo: The role of the rare earth," American Institute of Physics, Applied Physics Letters, 2013, 5 pages. http://scitation.aip.org/content/aip/journal/apl/102/9/10.1063/1.4794820?ver=pdfcov.

* cited by examiner

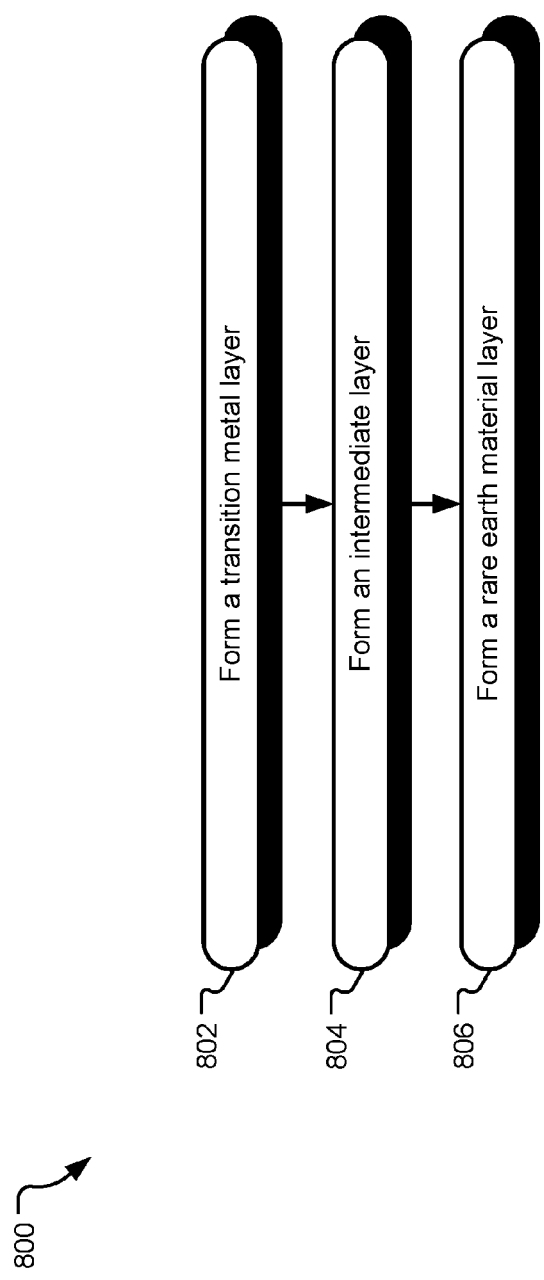

STORAGE DEVICE HEAD USING HIGH MAGNETIC MOMENT MATERIAL INCLUDING A RARE EARTH MATERIAL AND A TRANSITION METAL

CROSS-REFERENCE TO RELATED APPLICATIONS

The present application claims benefit of priority to U.S. Provisional Application No. 62/094,627, entitled "Storage Device Head Using High Magnetic Moment Material" and filed on Dec. 19, 2014, which is hereby incorporated by reference in its entirety.

BACKGROUND

In a magnetic data storage and retrieval system, a magnetic head typically includes a writer portion for storing magnetically encoded information on a magnetic media and a reader portion for retrieving the magnetically encoded information from the magnetic media. To write data to the magnetic media, an electrical current is caused to flow through a conductive coil to induce a magnetic field in a write pole. By reversing the direction of the current through the coil, the polarity of the data written to the magnetic media is also reversed. The writing performance of the write pole and the areal density achieved by the write pole depend upon the magnetic moment generated by the write pole.

SUMMARY

Implementations described and claimed herein provide a write pole structure including a write pole and a trailing shield wherein the write pole includes a high magnetic moment (HMM) material layer on a surface of the write pole facing the trailing shield, wherein the HMM material layer includes a laminated layer including a rare earth material layer and a transition metal layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

FIG. 8 illustrates a flow diagram of operations of forming a write pole structure according to an implementation disclosed herein.

DETAILED DESCRIPTIONS

Figure 1:
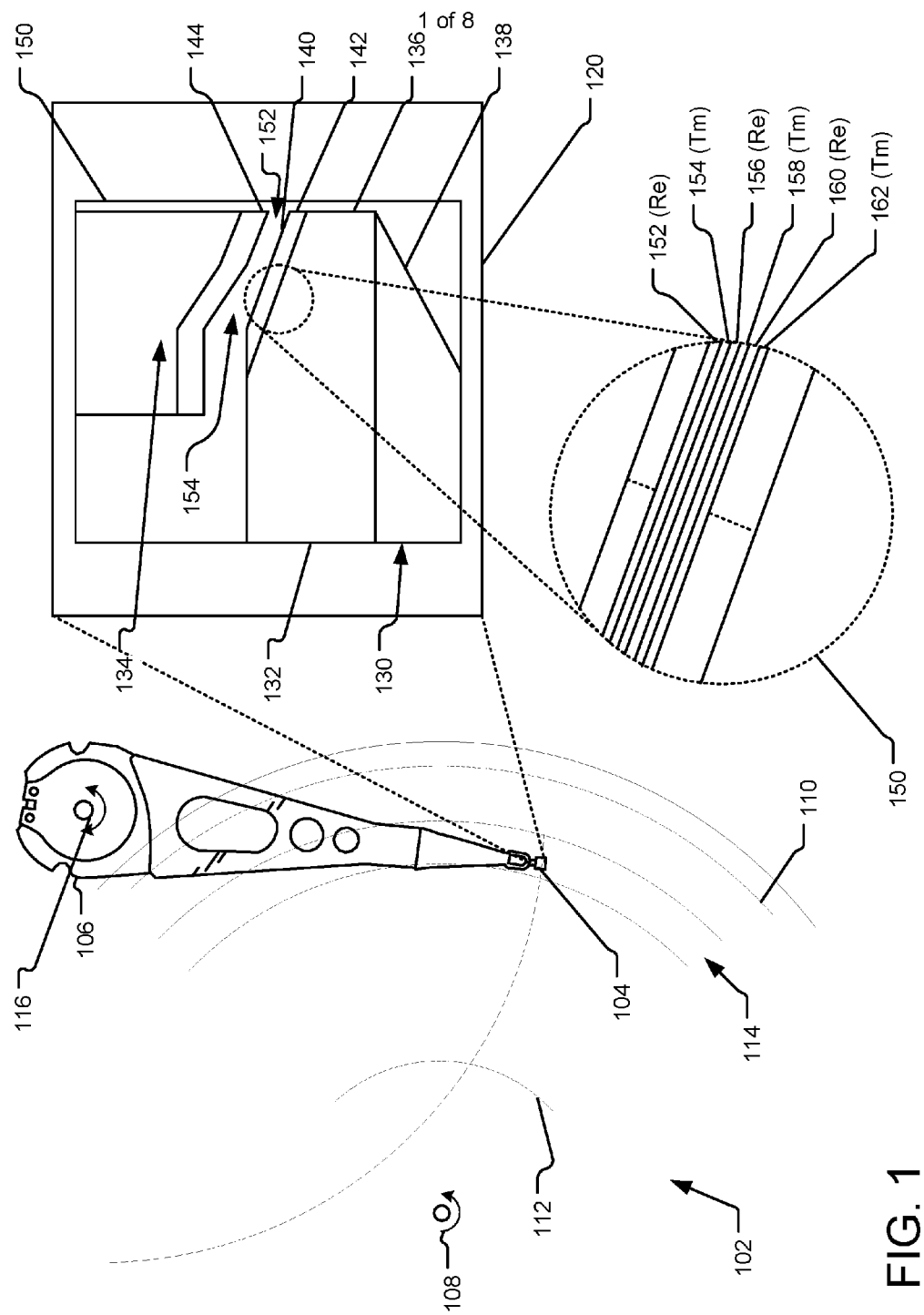
FIG. 1 illustrates a schematic block diagram illustrating an example write pole structure implemented on an end of an actuator assembly.

Perpendicular magnetic recording is used in the recording industry due to the improved super paramagnetics of recording bits in their remnant state. With the further push to increase areal density, recording writers are required to generate large write fields and field gradients in the recording layer of the magnetic media. However, the write field from recording writer's main pole is generally limited by the maximum magnetic moment of the head material and the pole geometry. As the dimensions of the tracks get smaller, the write pole and trailing edge pole width (TPWT) of the write poles also tend to get smaller. For write poles of small size, the writing performance and writing density of the write pole become increasingly dependent on the magnetic moment of the write pole.

The material used in write poles, such as CoFe alloy, provide magnetic moment in the range of 2.45 tesla. For example, write poles may be made of sputtered CoFe films or plated CoFe films, which are formed of appropriate shape at an air-bearing surface (ABS). Furthermore, such write poles may also include a bevel at the trailing edge of the write pole and a trailing shield separated by a non-magnetic gap from the write pole. Specifically, according to an implementation of the write pole disclosed herein, the beveled edge of the write pole is covered with a layer of high magnetic moment (HMM) material. Yet alternatively, an edge of the trailing shield facing the non-magnetic gap is also provided with a layer of HMM material.

The HMM material layer may include a laminated layer including a rare earth material layer and a transition metal layer. In one implementation, the rare earth material may be from the group of terbium (Tb), gadolinium (Gd), and dysprosium (Dy). In an alternative implementation, the laminated layer includes an intermediate layer of a transition metal that can mediate RKKY coupling effect. Yet alternative implementation may use an alloy of such transition metal that can mediate the RKKY coupling effect for the intermediate layer. The transition metal that can mediate the RKKY coupling effect may be any d-block transition metal.

To provide such a layer of HMM material on one or more edges of the write pole, an implementation disclosed herein provides a laminated structure that includes multiple layers of rare earth material and transition metal deposited alternatively. In a specific implementation of the write pole disclosed herein, the adjacent layers of rare earth material and transition metal are separated from each other by an intermediate layer of a transition metal that can mediate the RKKY coupling effect. For example, a d-block transition metal, such as, manganese (Mn), palladium (Pd), etc., may be used for the intermediate layer.

The thickness of each of the rare earth material and the transition metal may be in the range of 5 nm to 100 nm. On the other hand, the intermediate layer of the RKKY coupling effect mediator may have a thickness of less than three atoms of a d-block transition metal.

FIG. 1 illustrates an example block diagram illustrating an example write pole structure implemented on an end of an actuator assembly. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read sensor for reading data from the track 114 and a write pole for writing data to the track 114.

To read data from the magnetic disk 102, transitions on the track 114 of the disk 102 creates magnetic fields. As the read sensor passes over the transitions, the magnetic fields of the transitions modulate the resistance of the read sensor. The change in the resistance of the read sensor is detected by passing a sense current through the read sensor and then measuring the change in voltage across the read sensor. The resulting resistance-based signal is used to recover data encoded on the track of the disk 102. To write data to the magnetic media, an electrical current is caused to flow through a conductive coil to induce a magnetic field in a write pole. By reversing the direction of the current through the coil, the polarity of the data written to the magnetic media is also reversed.

The writing performance of the write pole and the areal density achieved by the write pole depend upon the magnetic moment generated by the write pole. Typically, materials used to construct write poles provide magnetic moment up to 2.45 Tesla. For example, CoFe is a widely used material in write poles wherein the write poles consist of sputtered CoFe films of plated CoFe films which are formed with an appropriate shape at the ABS. Furthermore, the write poles may also include a bevel at the trailing edge of the pole and a trailing shield separated from the write pole by a non-magnetic gap.

FIG. 1 also illustrates an expanded view 120 of a partial cross-sectional configuration of a write pole structure 130 that is located on the transducer head 104. The write pole 130 includes a write pole 132 and a trailing shield 134. The write pole 132 is shaped to define a write pole tip 136, a leading edge 138, and a trailing edge 140 for the write pole 132. In the implementation disclosed in FIG. 1, the trailing edge 140 includes an HMM material layer 142. For example, the HMM material layer 142 may include a laminated layer including a rare earth material layer and a transition metal layer. The trailing shield 134 further comprises an HMM material layer 144 on a surface of the trailing shield 134 facing the write pole 132. The HMM material layer 142 on the write pole 132 and the HMM material layer 144 on the trailing shield 134 increase the magnetic moment of the write pole structure 130. The write pole structure 130 defines an air-bearing surface (ABS) 150. When the write pole structure 130 is mounted on a transducer head, the ABS 150 is separated from a magnetic media by air. The improved magnetic moment at an edge 152 of a gap 154 between the write pole 132 and the trailing shield 134 allows the write pole structure 130 to write data in the magnetic media at higher density level.

FIG. 1 also illustrates an expanded view 150 of the HMM material layer 142. As shown therein, the HMM material layer 142 is a laminated structure including a number of layers 152-162 of rare earth (Re) material and transition metal (Tm). For example, the layer 152 is made of a rare earth material such as terbium (Tb), gadolinium (Gd), and dysprosium (Dy). The layer 154 may be made of a transition metal such as iron (Fe) or a transition metal alloy such as iron cobalt (FeCo), etc.

An alternative implementation of the HMM material layer 142 also includes an intermediate layer (not shown) between one or more pairs of Re layer and the Tm layer. For example, an intermediate layer may be provided between the Re layer 152 and the Tm layer 154. Such an intermediate layer is made of a transition metal that mediates the RKKY coupling effect between the Re layer 152 and the Tm layer 154. Examples of such transition metals that mediate the RKKY coupling effect are manganese (Mn), palladium (Pd), or any similar d-block transition metal. Yet alternatively, such an intermediate layer may be made of an alloy of such d-block transition metal.

An element table view of the transition metals in the d-blocks, that may be used to form the intermediate layer between the Re layer and the Tm layer is provided below:

| | Transition metals in the d-block | | | | | | | | |
|---|---|---|---|---|---|---|---|---|---|
| | Group | | | | | | | | |
| | 3 | 4 | 5 | 6 | 7 | 8 | 9 | 10 | 11 | 12 |
| Period 4 | Sc 21 | Ti 22 | V 23 | Cr 24 | Mn 25 | Fe 26 | Co 27 | Ni 28 | Cu 29 | Zu 30 |
| Period 5 | Y 39 | Zr 40 | Nb 41 | Mo 42 | Tc 43 | Ru 44 | Rh 45 | Pd 46 | Ag 47 | Cd 48 |
| Period 6 | 57-71 | Hf 72 | Ta 73 | W 74 | Re 75 | Os 76 | Ir 77 | Pt 78 | Au 79 | Hg 80 |
| Period 7 | 89-103 | Rf 104 | Db 105 | Sg 106 | Bh 107 | Hs 108 | Mt 109 | Ds 110 | Rg 111 | Cu 112 |

Specifically, the d-block transition metals suitable for use in the intermediate layer are Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs, and Cn. An implementation of the HMM material layer 142 includes a combination of one or more of such d-block transition metals or an alloy of such d-block transition metals in the intermediate layer.

Figure 2:
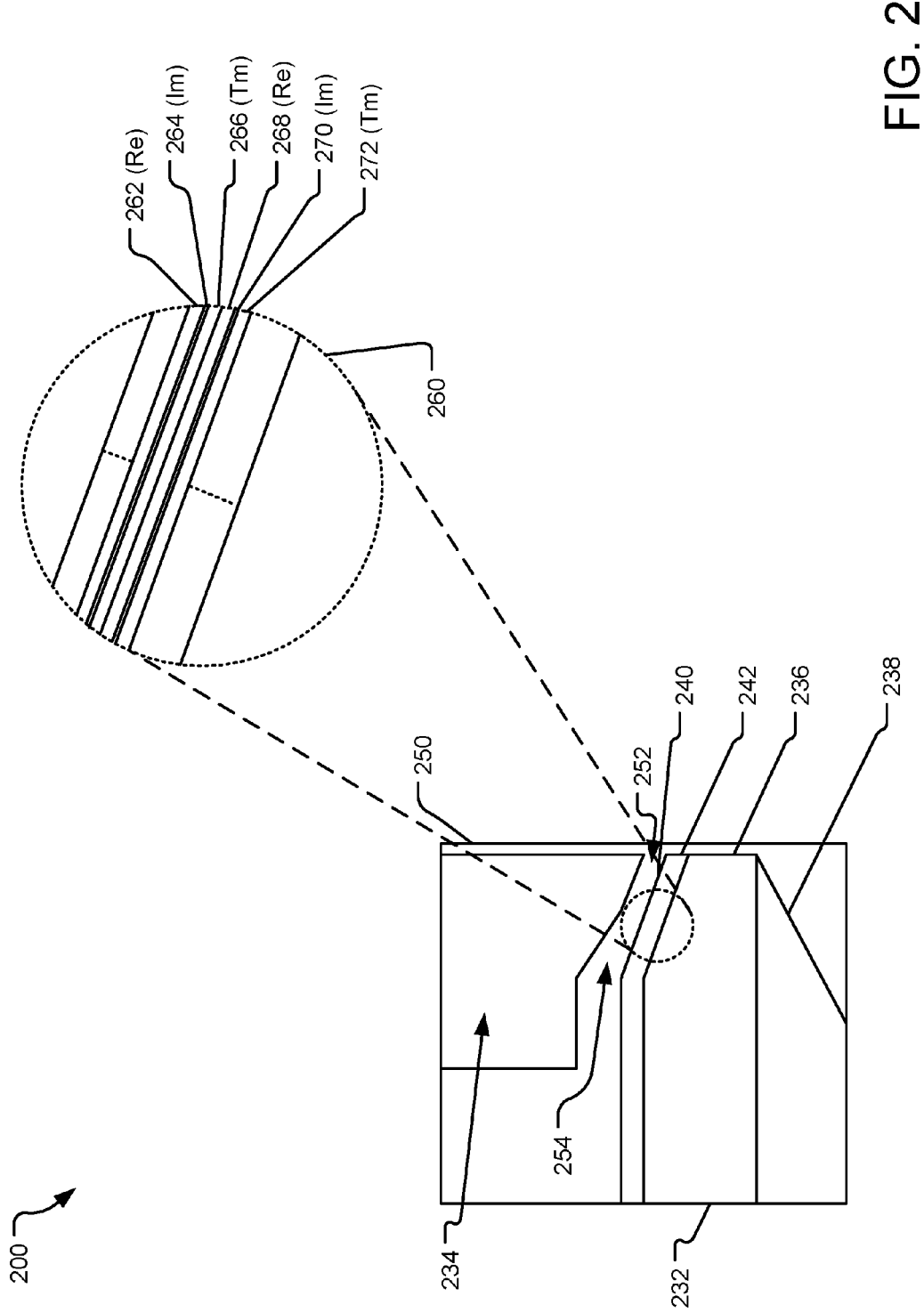
FIG. 2 illustrates an example block diagram of a write pole structure according to the implementations disclosed herein.

FIG. 2 illustrates an example block diagram of a write pole structure 200 according to the implementations disclosed herein. The write pole 200 includes a write pole 232 and a trailing shield 234. The write pole 232 is shaped to define a write pole tip 236, a leading edge 238, and a trailing edge 240 for the write pole 232. In the implementation disclosed in FIG. 2, the trailing edge 240 includes an HMM material layer 242. The HMM material layer 242 may be configured as a laminated structure including a plurality of rare earth material layers, a plurality of transition metal layers, and various intermediate layers separating the rare earth material layers and the transition metal layers.

Specifically, FIG. 2 shows an expanded view 260 of the HMM material layer 242. As shown therein, the HMM material layer 242 includes a series of layers of rare earth material (262, 268), a series of layers of transition metals (266, 272), and intermediate layers (264, 270) separating the rare earth material layers from the transition metal layers. The thickness of the rare earth material layers (262, 268) and the transition metal layers (266, 272) may be in the range of 5 nm to 100 nm. On the other hand, the intermediate layers (264, 270) may be made of one atomic layer of a d-block transition metal, three atomic layers of a d-block transition metal, five atomic layers of a d-block transition metal, or any odd number of layers of a d-block transition metal. In a specific implementation, the thickness of the intermediate layers (264, 270) is less than five atomic layers of a d-block transition metal or an alloy of a d-block transition metal.

The write pole structure 200 defines an air-bearing surface (ABS) 250. When the write pole structure 200 is mounted on a transducer head, the ABS 250 is separated from a magnetic media by air. The improved magnetic moment at an edge 252 of a gap 254 between the write pole 232 and the trailing shield 234 allows the write pole structure 200 to write data in the magnetic media at higher density level.

Figure 3:
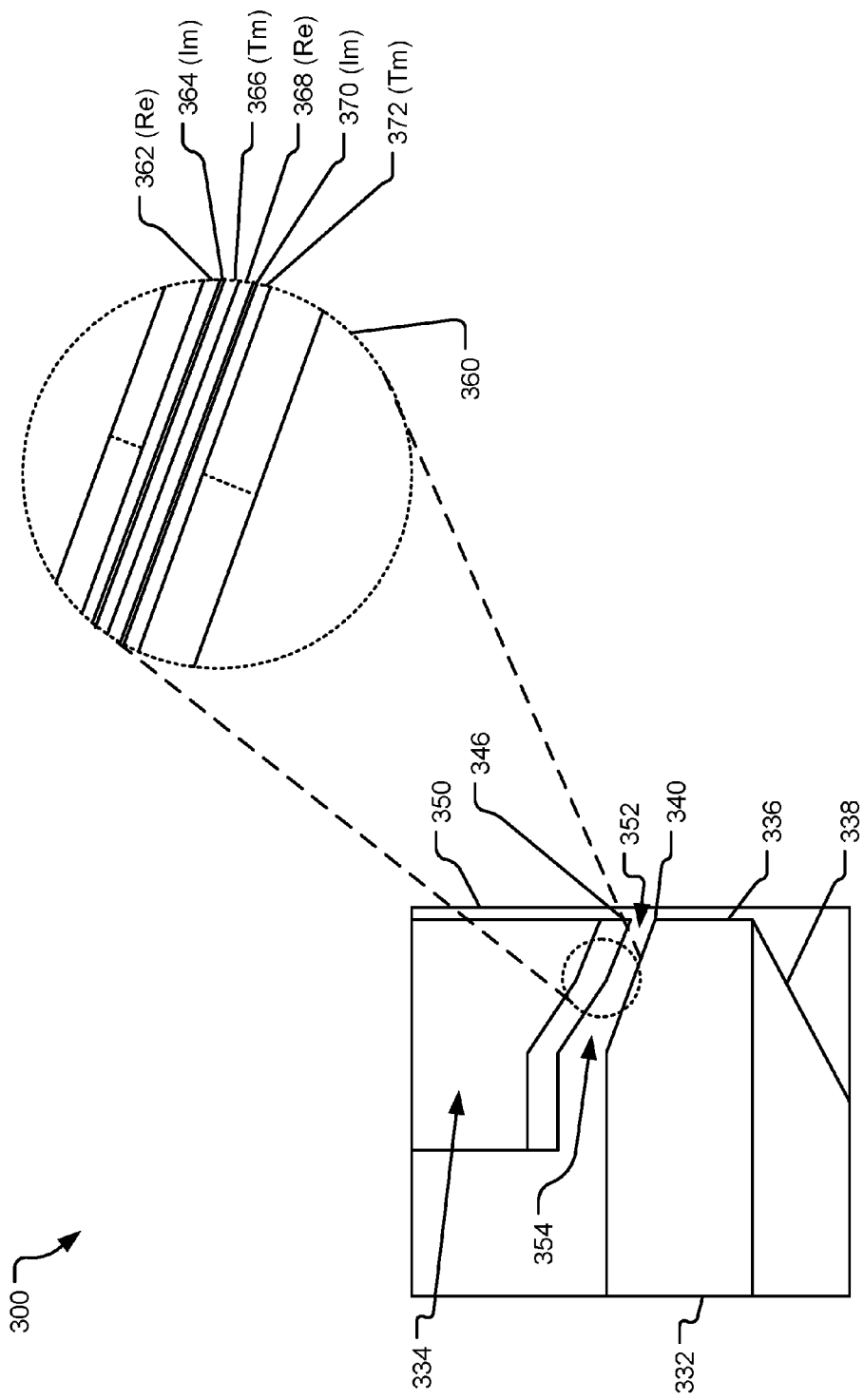
FIG. 3 illustrates an example block diagram of an alternative write pole structure according to the implementations disclosed herein.

FIG. 3 illustrates an example block diagram of an alternate write pole structure 300 according to the implementations disclosed herein. The write pole 300 includes a write pole 332 and a trailing shield 334. The write pole 332 is shaped to define a write pole tip 336, a leading edge 338, and a trailing edge 340 for the write pole 332. The trailing shield 334 further comprises an HMM material layer 346. The HMM material layer 346 on the trailing shield 334 increases the magnetic moment of the write pole structure 300. The write pole structure 300 defines the air-bearing surface (ABS) 350. When the write pole structure 300 is mounted on a transducer head, the ABS 350 is separated from a magnetic media by air. The improved magnetic moment at an edge 352 of a gap 354 between the write pole 332 and the trailing shield 334 allows the write pole structure 300 to write data in the magnetic media at higher density level.

FIG. 3 also illustrates an expanded view 360 of the HMM material layer 346. As shown therein, the HMM material layer 346 includes a series of layers of rare earth material (362, 368), a series of layers of transition metals (366, 372), and intermediate layers (364, 370) separating the rare earth material layers from the transition metal layers. The thickness of the rare earth material layers (362, 368) and the transition metal layers (366, 372) may be in the range of 5 nm to 100 nm. On the other hand, the intermediate layers (364, 370) may be made of one atomic layer of a d-block transition metal, three atomic layers of a d-block transition metal, five atomic layers of a d-block transition metal, or any odd number of layers of a d-block transition metal. In a specific implementation, the thickness of the intermediate layers (364, 370) is less than five atomic layers of a d-block transition metal or an alloy of a d-block transition metal.

Figure 4:
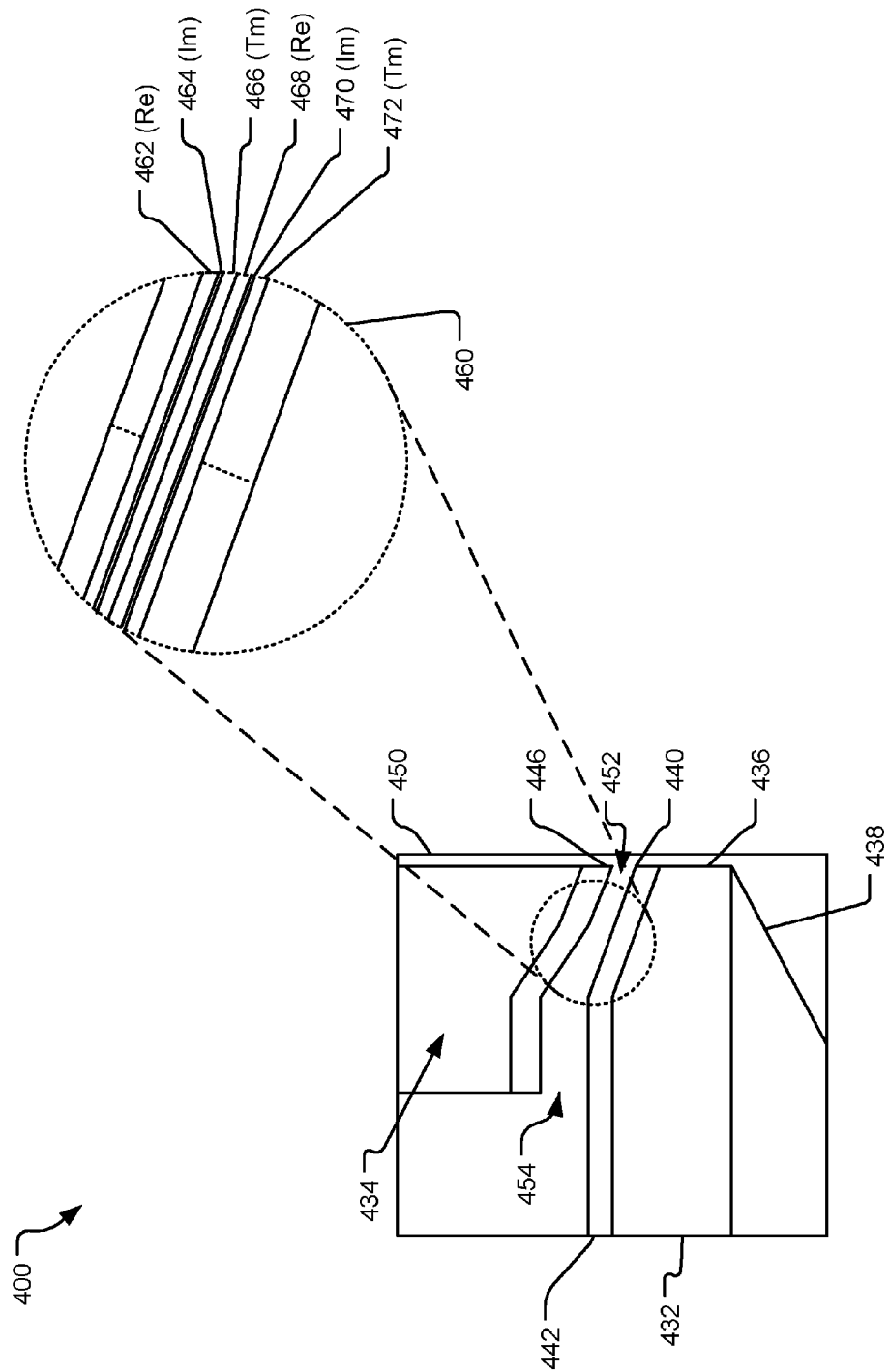
FIG. 4 illustrates an example block diagram of yet another write pole structure according to the implementations disclosed herein.

FIG. 4 illustrates an example block diagram of a write pole structure 400 according to the implementations disclosed herein. The write pole 400 includes a write pole 432 and a trailing shield 434. The write pole 432 is shaped to define a write pole tip 436, a leading edge 438, and a trailing edge 440 for the write pole 432. In the implementation disclosed in FIG. 4, the trailing edge 440 includes an HMM material layer 442. For example, the HMM material layer 442 may be a laminated structure including one or more layers of rare earth material, one or more layers of transition metals, and one or more intermediate layers separating the layers of rare earth material and layers of transition metals. Furthermore, the trailing edge 440 also includes an HMM material layer 446 facing the trailing edge 440 of the write pole 432.

The HMM material layer 442 on the write pole 432 and the HMM material layer 446 on the trailing shield 434 increase the magnetic moment of the write pole structure 400. The write pole structure 400 defines an air-bearing surface (ABS) 450. When the write pole structure 400 is mounted on a transducer head, the ABS 450 is separated from a magnetic media by air. The improved magnetic moment at an edge 452 of a gap 454 between the write pole 432 and the trailing shield 434 allows the write pole structure 400 to write data in the magnetic media at higher density level.

FIG. 4 also illustrates an expanded view 460 of the HMM material layers 442 and 446. As shown therein, the HMM material layers 442 and 446 include a series of layers of rare earth material (462, 468), a series of layers of transition metals (466, 472), and intermediate layers (464, 470) separating the rare earth material layers from the transition metal layers. The thickness of the rare earth material layers (462, 468) and the transition metal layers (466, 472) may be in the range of 5 nm to 100 nm. On the other hand, the intermediate layers (464, 470) may be made of one atomic layer of a d-block transition metal, three atomic layers of a d-block transition metal, five atomic layers of a d-block transition metal, or any odd number of layers of a d-block transition metal. In a specific implementation, the thickness of the intermediate layers (464, 470) is less than five atomic layers of a d-block transition metal or an alloy of a d-block transition metal.

Figure 5:
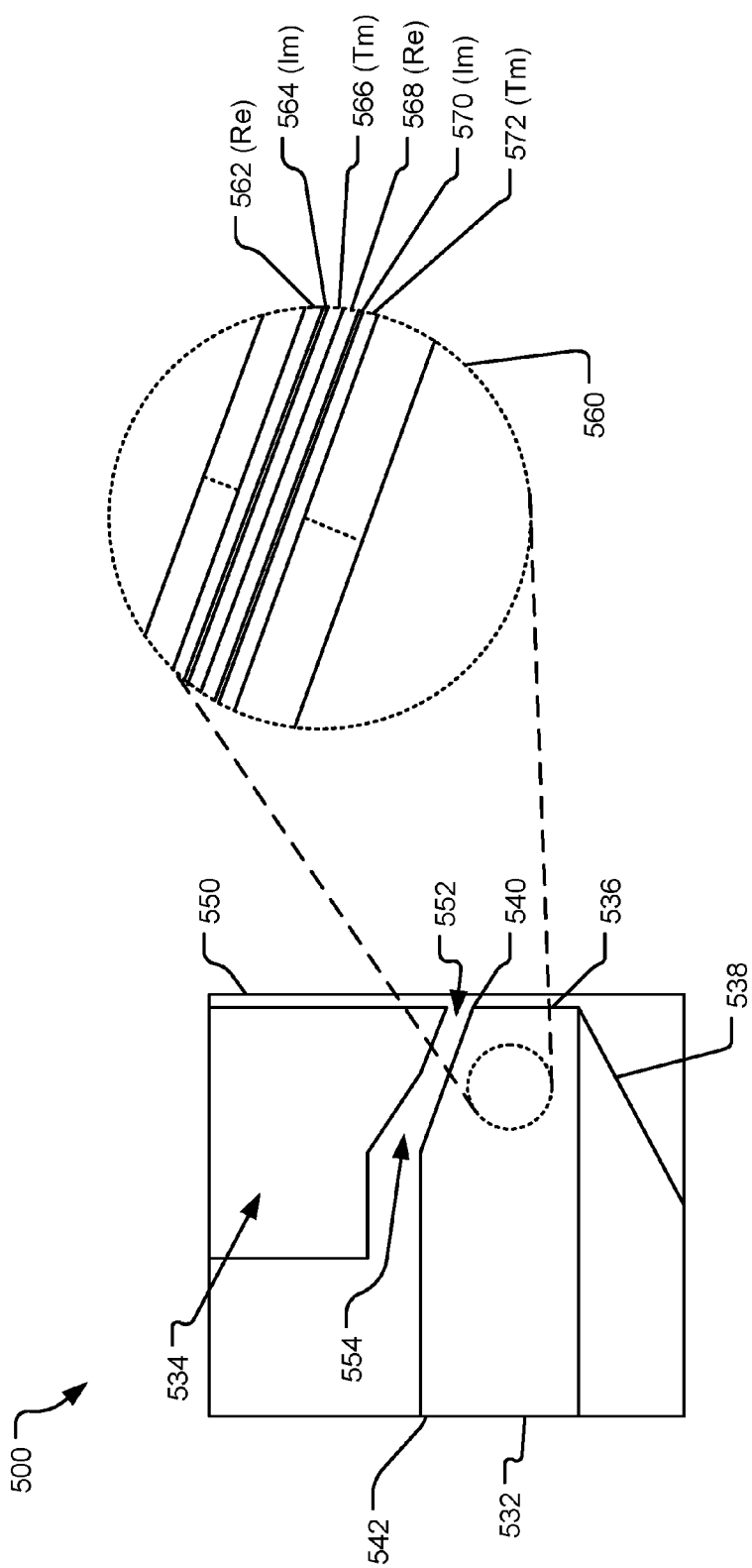
FIG. 5 illustrates an example block diagram of an alternative write pole structure according to the implementations disclosed herein.

FIG. 5 illustrates an example block diagram of a write pole structure 500 according to the implementations disclosed herein. The write pole 500 includes a write pole 532 and a trailing shield 534. The write pole 532 is shaped to define a write pole tip 536, a leading edge 538, and a trailing edge 540 for the write pole 532. In the implementation disclosed in FIG. 5, the entire write pole 532 includes an HMM material layer 542. For example, the HMM material layer 542 may be a laminated structure including one or more layers of rare earth material, one or more layers of transition metals, and one or more intermediate layers separating the layers of rare earth material and layers of transition metals.

The HMM material layer 542 of the write pole 532 increases the magnetic moment of the write pole structure 500. The write pole structure 500 defines an air-bearing surface (ABS) 550. When the write pole structure 500 is mounted on a transducer head, the ABS 550 is separated from a magnetic media by air. The improved magnetic moment at an edge 552 of a gap 554 between the write pole 532 and the trailing shield 534 allows the write pole structure 500 to write data in the magnetic media at higher density level.

FIG. 5 also illustrates an expanded view 560 of the HMM material layer 542. As shown therein, the HMM material layer 542 includes a series of layers of rare earth material (562, 568), a series of layers of transition metals (566, 572), and intermediate layers (564, 570) separating the rare earth material layers from the transition metal layers. The thickness of the rare earth material layers (562, 568) and the transition metal layers (566, 572) may be in the range of 5 nm to 100 nm. On the other hand, the intermediate layers (564, 570) may be made of one atomic layer of a d-block transition metal, three atomic layers of a d-block transition metal, five atomic layers of a d-block transition metal, or any odd number of layers of a d-block transition metal. In a specific implementation, the thickness of the intermediate layers (564, 570) is less than five atomic layers of a d-block transition metal or an alloy of a d-block transition metal.

Figure 6:
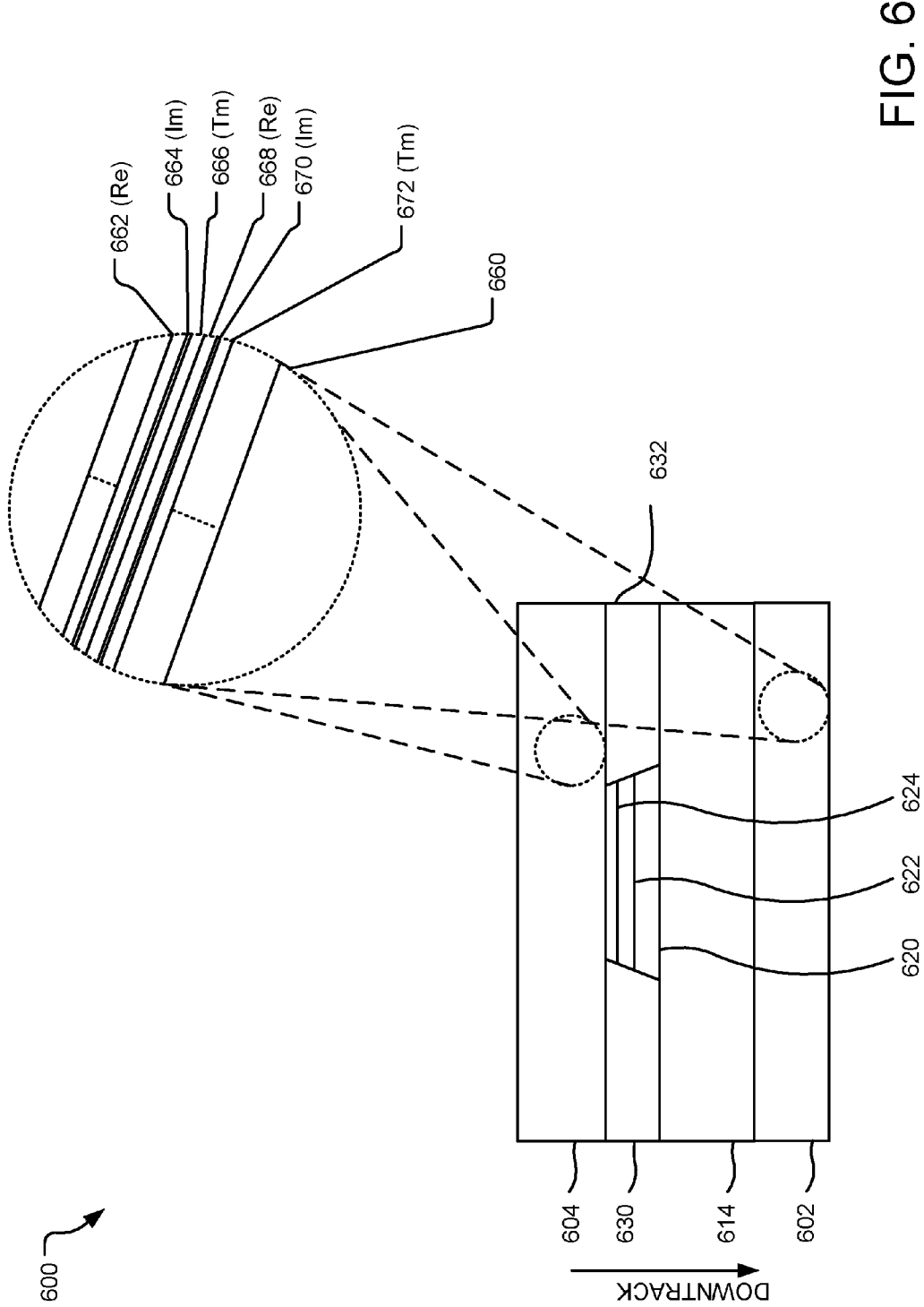
FIG. 6 illustrates an example block diagram of a read sensor structure according to the implementations disclosed herein.

FIG. 6 illustrates an example block diagram of a read sensor structure according to the implementations disclosed herein. Specifically, FIG. 6 illustrates an air bearing surface (ABS) view of an implementation of an MR sensor 600. MR sensor 600 includes a bottom shield 602 and a top shield 604 on two opposite sides (along down-track direction) of a sensor stack. The sensor stack may comprise a synthetic antiferromagnetic (SAF) layer 620, a free layer 622, and a cap layer 624. The sensor stack may be separated from the bottom shield 602 along the down-track direction by an antiferromagnetic (AFM) layer 614. Furthermore, two side shields 630 and 632 may be provided on two sides of the sensor stack along a cross-track direction.

In an implementation disclosed herein, either of the bottom shield 602 or the top shield 604 may be made of an HMM Material layer. FIG. 6 illustrates an expanded view 660 of the structure of such HMM material layer used in the bottom and top shields 602, 604. As shown therein, the HMM material layer includes a series of layers of rare earth material (662, 668), a series of layers of transition metals (666, 672), and intermediate layers (664, 670) separating the rare earth material layers from the transition metal layers. The thickness of the rare earth material layers (662, 668) and the transition metal layers (666, 672) may be in the range of 5 nm to 100 nm. On the other hand, the intermediate layers (664, 670) may be made of one atomic layer of a d-block transition metal, three atomic layers of a d-block transition metal, five atomic layers of a d-block transition metal, or any odd number of layers of a d-block transition metal. In a specific implementation, the thickness of the intermediate layers (664, 670) is less than five atomic layers of a d-block transition metal or an alloy of a d-block transition metal.

Figure 7:
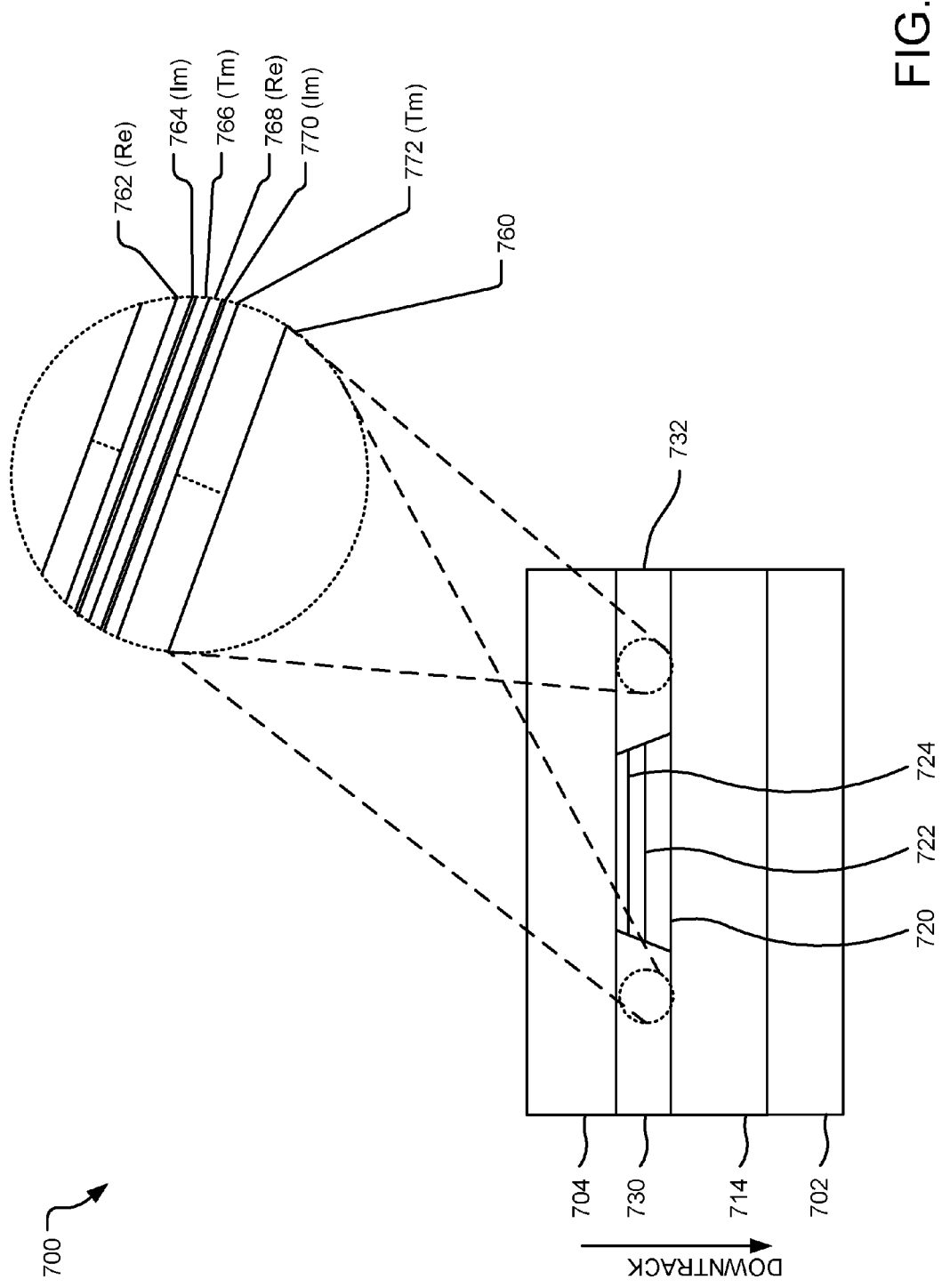
FIG. 7 illustrates an example block diagram of an alternative read sensor structure according to the implementations disclosed herein.

FIG. 7 illustrates an example block diagram of an alternative read sensor structure according to the implementations disclosed herein. Specifically, FIG. 7 illustrates an air bearing surface (ABS) view of an implementation of an MR sensor 700. The MR sensor 700 includes a bottom shield 702 and a top shield 704 on two opposite sides (along down-track direction) of a sensor stack. The sensor stack may comprise a synthetic antiferromagnetic (SAF) layer 720, a free layer 722, and a cap layer 724. The sensor stack may be separated from the bottom shield 702 along the down-track direction by an antiferromagnetic (AFM) layer 714. Furthermore, two side shields 730 and 732 may be provided on two sides of the sensor stack along a cross-track direction.

In an implementation disclosed herein, either of the side shield 730 and the side shield 732 may be made of an HMM Material layer. FIG. 7 illustrates an expanded view 760 of the structure of such HMM material layer used in the side shields 730, 732. As shown therein, the HMM material layer includes a series of layers of rare earth material (762, 768), a series of layers of transition metals (766, 772), and intermediate layers (764, 770) separating the rare earth material layers from the transition metal layers. The thickness of the rare earth material layers (762, 768) and the transition metal layers (766, 772) may be in the range of 5 nm to 100 nm. On the other hand, the intermediate layers (764, 770) may be made of one atomic layer of a d-block transition metal, three atomic layers of a d-block transition metal, five atomic layers of a d-block transition metal, or any odd number of layers of a d-block transition metal. In a specific implementation, the thickness of the intermediate layers (764, 770) is less than five atomic layers of a d-block transition metal or an alloy of a d-block transition metal.

FIG. 8 illustrates a flow diagram of operations 800 for forming an HMM material layer according to an implementation disclosed herein. The HMM material layer may be used in a write pole, a trailing shield of a write pole, a bottom shield of a sensor structure, a top shield of a sensor structure, a side shield of a sensor structure, etc. An operation 802 forms a layer of transition metal, such as Fe, CoFe, etc. The layer of transition metal may be formed, for example, by a thin film deposition method. An operation 804 forms an intermediate layer on the layer of transition metal. Such intermediate layer may be made of a d-block transition metal disclosed above. The intermediate layer may be formed, for example, by a thin film deposition method. Subsequently, an operation 806 forms a layer of rare earth material on top of the intermediate layer, wherein the rare earth material may be, for example, Tb, Gd, Dy, etc. The layer of rare earth material may be formed, for example, by a thin film deposition method. The thin film deposition method used by the operations 800 may be, for example, sputtering, molecular beam epitaxy, chemical vapor deposition, thermal evaporation, electron beam evaporation, etc.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A write pole structure comprising:
   a write pole;
   a trailing shield;
   a first high magnetic moment (HMM) material layer on a surface of the write pole facing the trailing shield, the first HMM material layer not being in physical contact with the trailing shield, wherein the first HMM material layer includes a first laminated layer including a rare earth material layer and a transition metal layer;
   a second HMM material layer on a surface of the trailing shield facing the write pole, the second HMM material layer not being in physical contact with the write pole, wherein the second HMM material layer includes a second laminated layer including another rare earth material layer and another transition metal layer, the first HMM material layer and the second HMM material layer being separated by a gap.

2. The write pole structure of claim 1, wherein:
   the first laminated layer further comprises a first intermediate layer between the rare earth material layer and the transition metal layer, wherein the first intermediate layer is made of a transition metal that can mediate RKKY coupling effect.

3. The write pole structure of claim 2, wherein the intermediate layer has a thickness of less than three atoms of the transition metal that can mediate RKKY coupling effect.

4. The write pole structure of claim 2, wherein the transition metal that can mediate RKKY coupling effect is any d-block transition metal.

5. The write pole structure of claim 2, wherein the transition metal that can mediate RKKY coupling effect is at least one of palladium (Pd) and manganese (Mn).

6. The write pole structure of claim 2, wherein the transition metal that can mediate RKKY coupling effect is an alloy of at least one of d-block transition metals.

7. The write pole structure of claim 1, wherein thickness of the rare earth material layer is between 5 nm and 100 nm.

8. The write pole structure of claim 1, wherein thickness of the transition metal layer is between 5 nm and 100 nm.

9. The write pole structure of claim 1, wherein the rare earth material layer comprises at least one of terbium (Tb), gadolinium (Gd), and dysprosium (Dy).

10. The write pole structure of claim 1, wherein the transition metal layer comprises at least one of iron (Fe) and iron-cobalt (FeCo).

11. The write pole structure of claim 1, wherein the second laminated layer includes a second intermediate layer between the another rare earth material layer and the another transition metal layer, wherein the second intermediate layer is made of another transition metal layer that can mediate RKKY coupling effect.

12. An apparatus comprising:
a trailing shield including a first plurality of laminated layers, each of the first plurality of laminated layers including a rare earth material layer and a transition metal layer; and
a write pole, wherein the write pole is made of a second plurality of laminated layers, each of the second plurality of laminated layers including a rare earth material layer and a transition metal layer;
wherein the first plurality of laminated layers is not in physical contact with the second plurality of laminated layers.

13. The apparatus of claim 12 wherein each of the plurality of laminated layers further comprises an intermediate layer between the rare earth material layer and the transition metal layer, wherein the intermediate layer is made of at least one of a d-block transition metal and an alloy of a d-block transition metal.

14. The apparatus of claim 13 wherein the intermediate layer has a thickness equivalent to at least one of one atom, three atoms, and five atoms.

15. The apparatus of claim 12 wherein the rare earth material layer comprises at least one of terbium (Tb), gadolinium (Gd), and dysprosium (Dy).

16. The apparatus of claim 12 wherein the transition metal layer comprises at least one of iron (Fe) and iron-cobalt (FeCo).

17. The apparatus of claim 12 wherein thickness of the rare earth material layer is between 5 nm and 100 nm and wherein thickness of the transition metal layer is between 5 nm and 100 nm.

18. A magnetoresistive sensor, comprising:
a reader sensor structure including one or more side shields, a top shield, and a bottom shield, wherein the top shield, the bottom shield, and at least one of the one or more side shields includes a plurality of laminated layers, each of the plurality of laminated layers including a rare earth material layer and a transition metal layer.

19. The magnetoresistive sensor of claim 18, further comprising a write pole structure including another plurality of laminated layers, each of the another plurality of laminated layers including another rare earth material layer and another transition metal layer.

* * * * *